(12) United States Patent
Luo et al.

(10) Patent No.: US 11,113,277 B2
(45) Date of Patent: Sep. 7, 2021

(54) SYSTEM AND METHOD FOR REAL-TIME MATERIALIZED VIEW MAINTENANCE (71) Applicant: INTERNATIONAL BUSINESS MACHINES CORPORATION, Armonk, NY (US)

(72) Inventors: Gang Luo, Bellevue, WA (US); Philip Shi-lung Yu, Chappaqua, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/935,836

(22) Filed: Mar. 26, 2018

(65) Prior Publication Data
US 2018/0210915 A1    Jul. 26, 2018

Related U.S. Application Data

(63) Continuation of application No. 12/061,162, filed on Apr. 2, 2008, now Pat. No. 9,984,119, which is a continuation of application No. 11/386,346, filed on Mar. 22, 2006, now abandoned.

(51) Int. Cl.
*G06F 16/2453* (2019.01)

(52) U.S. Cl.
CPC .... *G06F 16/24535* (2019.01); *G06F 16/2453* (2019.01); *G06F 16/24539* (2019.01)

(58) Field of Classification Search
CPC ......... G06F 16/24535; G06F 16/24539; G06F 16/2453
See application file for complete search history.

(56) References Cited

U.S. PATENT DOCUMENTS

| | | | | |
|---|---|---|---|---|
| 5,551,031 | A | * | 8/1996 | M. Cheng ........... G06F 16/2456 |
| 6,026,390 | A | * | 2/2000 | Ross ................... G06F 16/2393 |
| 6,134,543 | A | * | 10/2000 | Witkowski ........ G06F 16/24553 |

(Continued)

OTHER PUBLICATIONS

Blakeley et al., "Updating Derived Relations: Detecting Irrelevant and Autonomously Computable Updates", ACM Transactions on Database Systems (TODS), vol. 14, No. 3; 1989; pp. 369-400.

(Continued)

*Primary Examiner* — Kannan Shanmugasundaram
(74) *Attorney, Agent, or Firm* — Tutunjian & Bitetto, P.C.; Kurt Goudy (57) ABSTRACT

Methods and systems for maintaining a materialized view defined on a relation of a relational database include providing a materialized view maintenance system implemented in a computing device having at least a processor and a memory device. It is determined whether an update to a base relation is irrelevant with respect to the materialized view by performing content-based filtering on the base relation using the materialized view maintenance system. An estimate of at least one of an importance and an effect of the update to the base relation is generated. One or both of performing a load shedding operation on the relational database based upon the estimate and quantifying the effect of the update being omitted from the materialized view based on the estimate is performed. The maintained materialized view is displayed so as to exclude determined irrelevant updates.

13 Claims, 7 Drawing Sheets

(56) References Cited

U.S. PATENT DOCUMENTS

| | | | |
|---|---|---|---|
| 7,016,910 B2 | 3/2006 | Egilsson et al. | |
| 7,092,951 B1* | 8/2006 | Luo | G06F 16/24539 |
| 7,111,020 B1* | 9/2006 | Gupta | G06F 16/24539 |
| 2006/0242102 A1* | 10/2006 | Bruno | G06F 16/22 |
| | | | 707/999.001 |

OTHER PUBLICATIONS

Blakeley et al., "Efficiently Updating Materialized Views", ACM International Conference on Management of Data (SIGMOD), 1986; pp. 61-71.

Alan Y. Levy et al., "Queries Independent of Updates", International Conference on Very Large Data bases (VLDB), 1993, pp. 171-181.

Gang Luo et al., "A Comparsion of Three Methods for Join View Maintenance in Parallel RDBMS", Proceedings of the 19th International Conference on Data Engineering, Mar. 5-8, 2003, Bangalore, India (ICDE), 2003; pp. 177-188.

Dallan Quass et al., "Making Views Self-Maintainable for Data Warehousing", Proceedings of the Fourth International Conference on Parallel and Distributed Information Systems, Dec. 18-20, 1996, Miami Beach, FL; 1996; pp. 158-169.

Burroughs, T., et al. "ORACLE9i Advanced Replication" Release 2 (9.2). Mar. 2002. (360 Pages) http://download.oracle.com/docs/cd/B10501_01/server.920/a96567.pdf.

Luo, G., et al. "A Comparison of Three Methods for Join View Maintenance in Parallel RDBMS" Proceedings of the 19th International Conference on Data Engineering. Mar. 2003. pp. 1-12.

Quass, D., et al. "Making Views Self-Maintainable for Data Warehousing" Proceedings of the Fourth International Conference on Parallel and Distributed Information Systems. Dec. 1996. pp. 1-17.

\* cited by examiner

SYSTEM AND METHOD FOR REAL-TIME MATERIALIZED VIEW MAINTENANCE

BACKGROUND

1. Technical Field

The present invention relates generally to relational databases and, more particularly, to a system and method for real-time materialized view maintenance for relational databases.

2. Description of the Related Art

Recently, there has been a growing trend to use data warehouses to make real-time decisions about a corporation's day-to-day operations. Most major relational database management system (RDBMS) vendors have spent great efforts on real-time data warehousing, including IBM's business intelligence, MICROSOFT's digital nervous system, ORACLE's Oracle10g, NCR's active data warehouse, and COMPAQ's zero-latency enterprise.

A real-time data warehouse needs to handle real-time, online updates in addition to the traditional data warehouse query workload. This raises a problem that is present to a lesser degree in traditional data warehouses, namely when a base relation is updated, maintaining the materialized view(s) defined on it can bring a heavy burden to the corresponding RDBMS.

To mitigate this problem, several methods have been proposed to detect irrelevant updates to a base relation R that do not affect the materialized view MV defined on R. For example, see the following, which are each incorporated by reference herein: Blakeley et al, "Updating Derived Relations: Detecting Irrelevant and Autonomously Computable Updates", ACM Transactions on Database Systems (TODS), 1989, 14(3), pp. 369-400; Blakeley et al., "Efficiently Updating Materialized Views", ACM International Conference on Management of Data (SIGMOD), 1986, pp. 61-71; and Levy et al., "Queries Independent of Updates", International Conference on Very Large Data Bases (VLDB), 1993, pp. 171-181. However, all of these methods are "content-independent" in the sense that they only consider the "where" clause condition in a materialized view's definition while ignoring the content in the other base relations of the materialized view. As a result, these methods make over-conservative decisions and miss a large number of filtering opportunities.

For example, consider the following materialized view MV:
create materialized view MV as
select * from R, S, T
where R.a=S.b and S.c=T.d
and R.e>20 and S.f="xyz" and T.g=50;

Assume that a materialized view MV records anomaly exists so that very few tuples in R, S, and T satisfy the where clause condition (R.a=S.b and S.c=T.d and R.e>20 and S.f="xyz" and T.g=50) in the MV's definition. Suppose a tuple $t_R$ whose $t_R.e$=30 is inserted into base relation R. Since $t_R.e$>20, the existing prior art methods in the above-referenced articles cannot tell whether or not the MV will change. Therefore, the standard materialized view maintenance method has to be used, as follows. S is checked for a matching tuple(s) $t_S$ such that $t_S.b=t_R.a$ and $t_S.f$="xyz". If such a matching tuple $t_S$ exists, then T is further checked for matching tuple(s) $t_T$ such that $t_T.d=t_S.c$ and $t_T.g$=50. If both S and T are large and cannot be cached in memory, then such checking can incur a large number of input and output operations and become fairly expensive. However, because of the MV records anomaly, it is most likely that the insertion of $t_R$ into R will not affect the MV and, thus, all of the expensive checking is wasted.

SUMMARY

A method for maintaining a materialized view defined on a relation of a relational database includes providing a materialized view maintenance system implemented in a computing device having at least a processor and a memory device. It is determined whether an update to a base relation is irrelevant with respect to the materialized view by performing content-based filtering on the base relation using the materialized view maintenance system. An estimate of at least one of an importance and an effect of the update to the base relation is generated. One or both of performing a load shedding operation on the relational database based upon the estimate and quantifying the effect of the update being omitted from the materialized view based on the estimate is performed. The maintained materialized view is displayed so as to exclude determined irrelevant updates.

A system for maintaining a materialized view defined on a relation of a relational database includes a memory device configured to store the base relation therein. A materialized view manager is configured to determine whether an update to the base relation is irrelevant with respect to the materialized view by performing content-based filtering on the base relation using the materialized view maintenance system, to generate an estimate of at least one of an importance and an effect of the update to the base relation, to at least one of performing a load shedding operation on the relational database based upon the estimate and quantifying the effect of the update being omitted from the materialized view based on the estimate, and to display the maintained materialized view so as to exclude determined irrelevant updates.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present principles are directed to a system and method for real-time materialized view maintenance. Advantageously, embodiments of the present principles may be used to identify irrelevant updates to a relation (a base relation or a derived relation) with respect to a materialized view defined on that relation. The irrelevant updates are identified more accurately and efficiently as compared to prior art approaches for performing the same.

It should be understood that the elements shown in the FIGURES may be implemented in various forms of hardware, software or combinations thereof. Preferably, these elements are implemented in software on one or more appropriately programmed general-purpose digital computers having a processor and memory and input/output interfaces.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
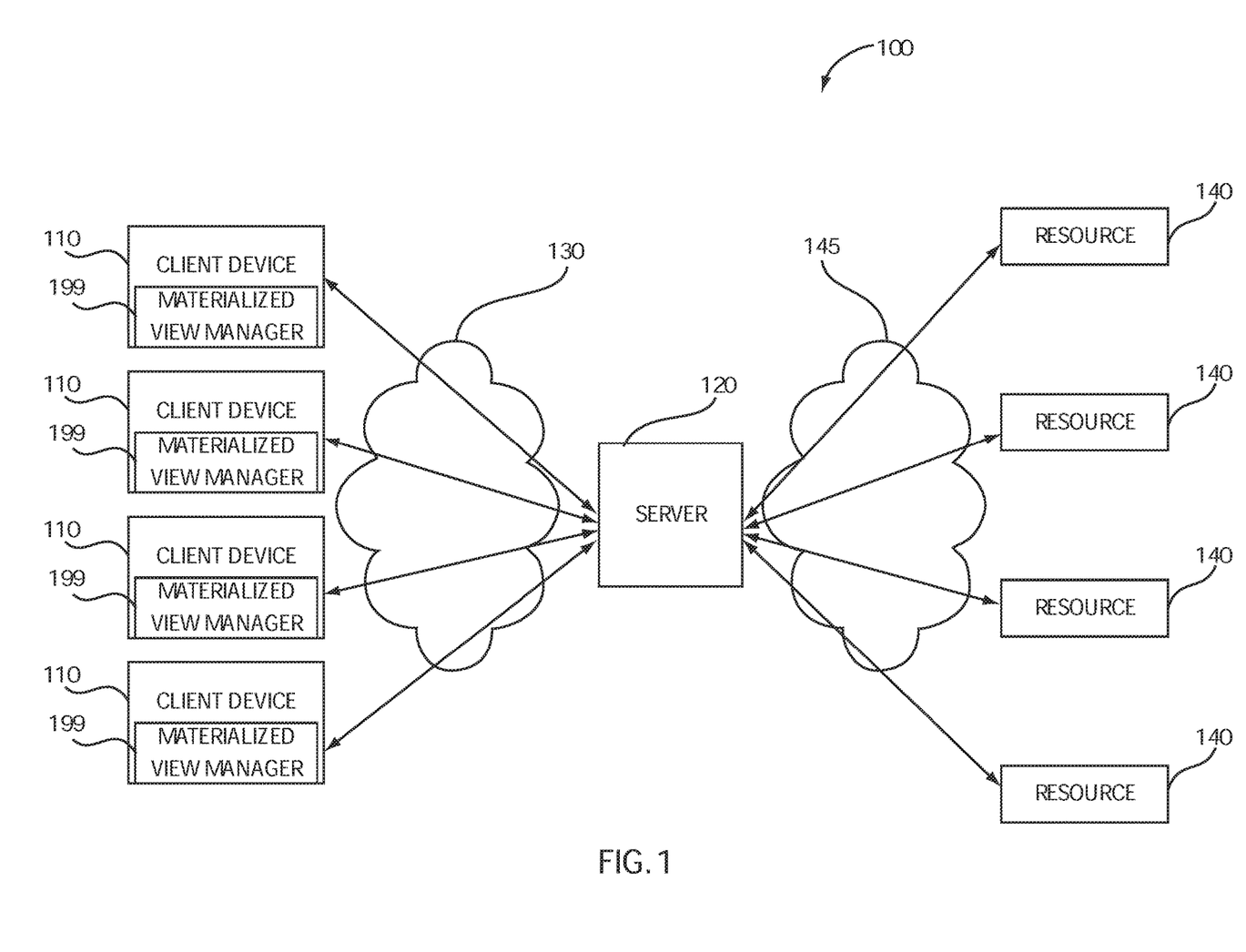
FIG. 1 is a block diagram illustrating an exemplary networked environment to which the present principles may be applied, according to an embodiment thereof.

Referring now to the drawings in which like numerals represent the same or similar elements and initially to FIG. 1, an exemplary networked environment to which the present principles may be applied, is indicated generally by the reference numeral 100. The environment 100 includes one or more client devices 110 connected to a server 120 via a network 130. The network 130 may include wired and/or wireless links. The server 120 may be connected in signal communication with one or more resources 140. The resources 140 may include one or more local and/or remote sources. The resources 140 may be connected to the server 120 directly and/or via, e.g., one or more networks 145 (including wired and/or wireless links). Each of the client devices 110 may include a materialized view maintenance system 199 (also referred to herein as "materialized view manager") for maintaining a materialized view as described herein.

Figure 2:
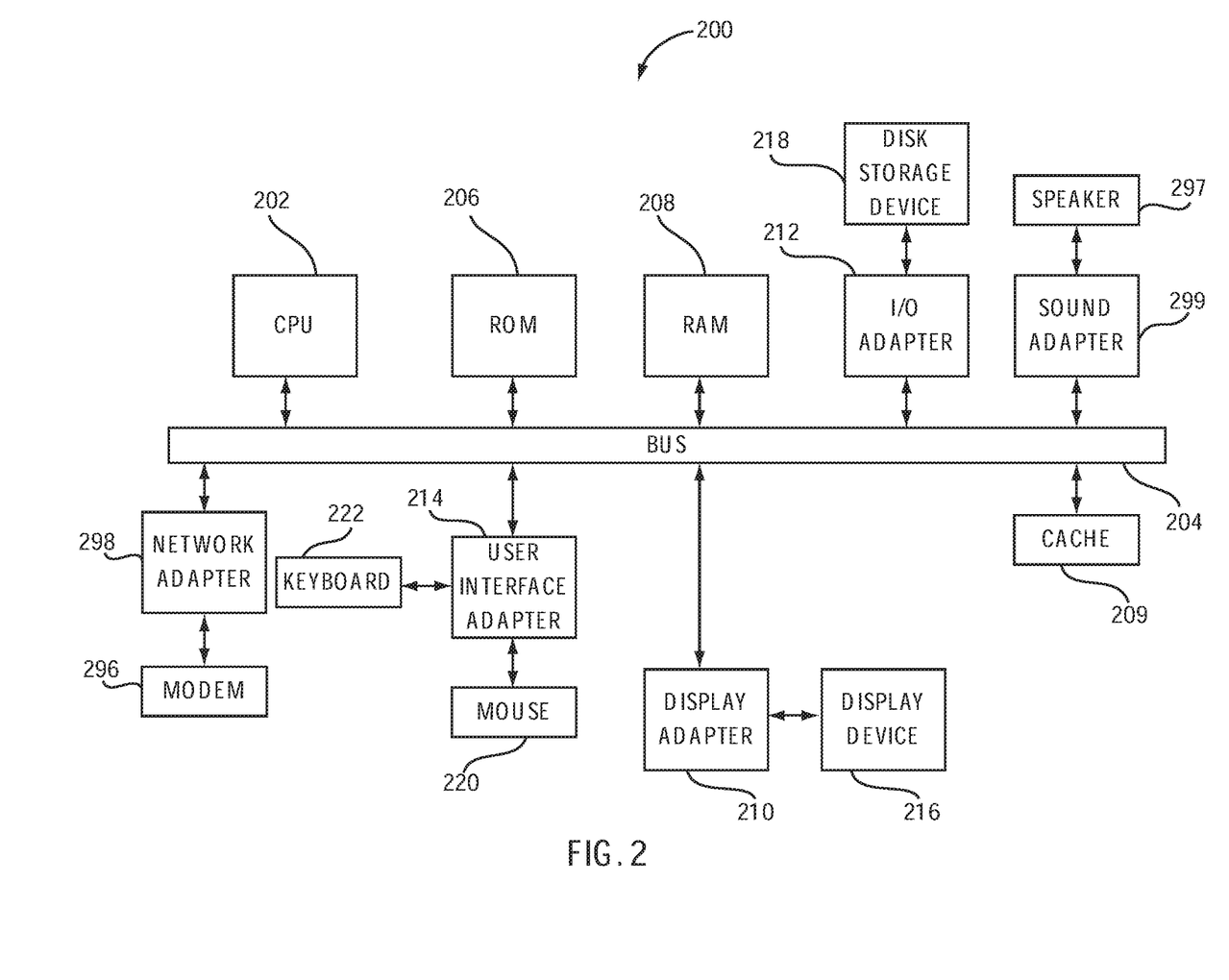
FIG. 2 is a block diagram illustrating an exemplary computing device to which the present principles may be applied, according to an embodiment thereof.

Turning to FIG. 2, an exemplary computing device to which the present principles may be applied is indicated generally by the reference numeral 200. It is to be appreciated that elements of the computing device 200 may be employed in any of the client devices 110, the server 120, and/or the resources 140. Moreover, it is to be further appreciated that elements of the computing device 200 may be employed in the materialized view maintenance system 199.

The computing device 200 includes at least one processor (CPU) 202 operatively coupled to other components via a system bus 204. A read only memory (ROM) 206, a random access memory (RAM) 208, a display adapter 210, an I/O adapter 212, a user interface adapter 214, a sound adapter 299, and a network adapter 298, are operatively coupled to the system bus 204.

A display device 216 is operatively coupled to system bus 204 by display adapter 210. A disk storage device (e.g., a magnetic or optical disk storage device) 218 is operatively coupled to system bus 204 by I/O adapter 212.

A mouse 220 and keyboard 222 are operatively coupled to system bus 204 by user interface adapter 214. The mouse 220 and keyboard 222 are used to input and output information to and from system 200.

At least one speaker (herein after "speaker") 297 is operatively coupled to system bus 204 by sound adapter 299. A (digital and/or analog) modem 296 is operatively coupled to system bus 204 by network adapter 298.

To address the above-mentioned problems of the prior art approaches to maintaining a materialized view on a relation of a relational database, we introduce content-based filtering into materialized view maintenance. In one embodiment, up to four illustrative requirements may be utilized for efficient filtering to identify irrelevant updates to base relations of a materialized view. In an embodiment, we design "filtering relations" that summarize the most relevant information in the base relations and fulfill pre-specified requirements such as, but not limited to, the four illustrative requirements described herein. These filtering relations capture the relationship among multiple join attributes and can be efficiently maintained in real time. Upon an update $\Delta R$ to a base relation R that has a materialized view MV defined on it, the RDBMS uses the corresponding filtering relations of the other base relations of the MV to determine whether or not $\Delta R$ is irrelevant. The checking of filtering relations is usually significantly faster than checking base relations. Also, compared to the where clause condition in the MV's definition, filtering relations can provide more precise information about whether or not $\Delta R$ is irrelevant. In this way, the RDBMS can quickly and more precisely detect irrelevant updates to R and hence reduce the materialized view maintenance overhead.

In an embodiment, one or more of the following four illustrative requirements may be used to design effective summary data structures: compactness; association; a high filtering ratio; and easy maintenance. As noted above, the present invention is not limited to only these four illustrative requirements and, given the teachings of the present invention provided herein, one of ordinary skill in this and related arts will contemplate these and various other requirements for implementing content-based filtering for materialized view maintenance, while maintaining the scope of the present invention. Moreover, different implementations of any of these same four requirements may also be implemented in accordance with the present principles, while maintaining the scope of the present principles.

Consider a base relation R that has a join view JV defined on it. Our goal is to quickly filter out most of the irrelevant updates to R. This filtering process allows false negatives for irrelevant updates but not false positives. In other words, for any update $\Delta R$ to R, this filtering process may include the following characteristics.

For example, in one characteristic, if our method says that $\Delta R$ is irrelevant, then it must be true that $\Delta R$ is irrelevant.

In another characteristic, in the case that $\Delta R$ is irrelevant, with high probability p, our method can determine that $\Delta R$ is irrelevant; with low probability 1-p, our method indicates that it does not know whether $\Delta R$ is irrelevant.

In yet another characteristic, in the case that $\Delta R$ is relevant, our method indicates that it does not know whether $\Delta R$ is irrelevant.

As noted above, it is preferable to use one or more (and preferably, although not necessarily, all) of the following requirements to design effective summary data structures: compactness; association; a high filtering ratio; and easy maintenance.

Regarding compactness, the summary data structures are preferably small as they are likely to be cached in memory. Thus, compactness can be an issue in achieving real-time results.

Regarding association, the summary data structures preferably capture the relationship among multiple join attributes of a base relation. That is, given a join attribute value (e.g., S.b of the MV in the introduction), we can use the join attribute value to find the associated values of other join attributes (e.g., S.c).

Regarding the high filtering ratio, the summary data structures can preferably quickly and correctly filter out most (or all) of the irrelevant updates to the base relations of a join view.

Regarding easy maintenance, upon updates to the base relations, the summary data structures are preferably efficiently maintained in real time.

There are several existing summary data structures (e.g., bloom filters, multi-attribute B-tree indices, and so forth). However, none of the existing summary data structures satisfies all of the above four properties nor is otherwise suitable for our filtering purposes.

In the following, we first give an overview of our content-based detection method for irrelevant updates. Thereafter, a more detailed description of the content-based detection method is provided.

Consider a join view JV that is defined on base relations $R_1, R_2, \ldots,$ and $R_n$ ($n \geq 2$). For each $R_i$ ($1 \leq s \leq n$), we create a filtering relation $FR_i$ that summarizes the most relevant information in $R_i$. Upon an update $\Delta R_i$ to a base relation $R_i$ ($1 \leq i \leq n$) of JV, our content-based method performs the following operations.

Operation $O_1$: Update the filtering relation $FR_i$ accordingly.

Operation $O_2$: To detect whether or not $\Delta R_i$ is irrelevant, use the where clause condition in the JV's definition and techniques such as, but not limited to, those described by the following, which are each incorporated by reference herein: Blakeley et al, "Updating Derived Relations: Detecting Irrelevant and Autonomously Computable Updates", TODS 14(3): 369-400, 1989; Blakeley et al., "Efficiently Updating Materialized Views", SIGMOD Conf. 1986: 61-71; and Levy et al., "Queries Independent of Updates", VLDB 1993: 171-181.

Operation $O_3$: If Operation $O_2$ cannot tell that $\Delta R_i$ is irrelevant, then check the filtering relations $FR_1, FR_2, \ldots, FR_{i-1}, FR_{i+1}, FR_{i+2}, \ldots,$ and $FR_n$ to determine whether or not $\Delta R_i$ is irrelevant.

Operation $O_4$: If Operation $O_3$ cannot tell that $\Delta R_i$ is irrelevant, then check base relations $R_1, R_2, \ldots, R_{i-1}, R_{i+1}, R_{i+2}, \ldots,$ and $R_n$ to determine exactly whether or not $\Delta R_i$ is irrelevant. In the case that $\Delta R_i$ is relevant, the JV is refreshed. Operation $O_4$ is the standard join view maintenance method.

Figure 3:
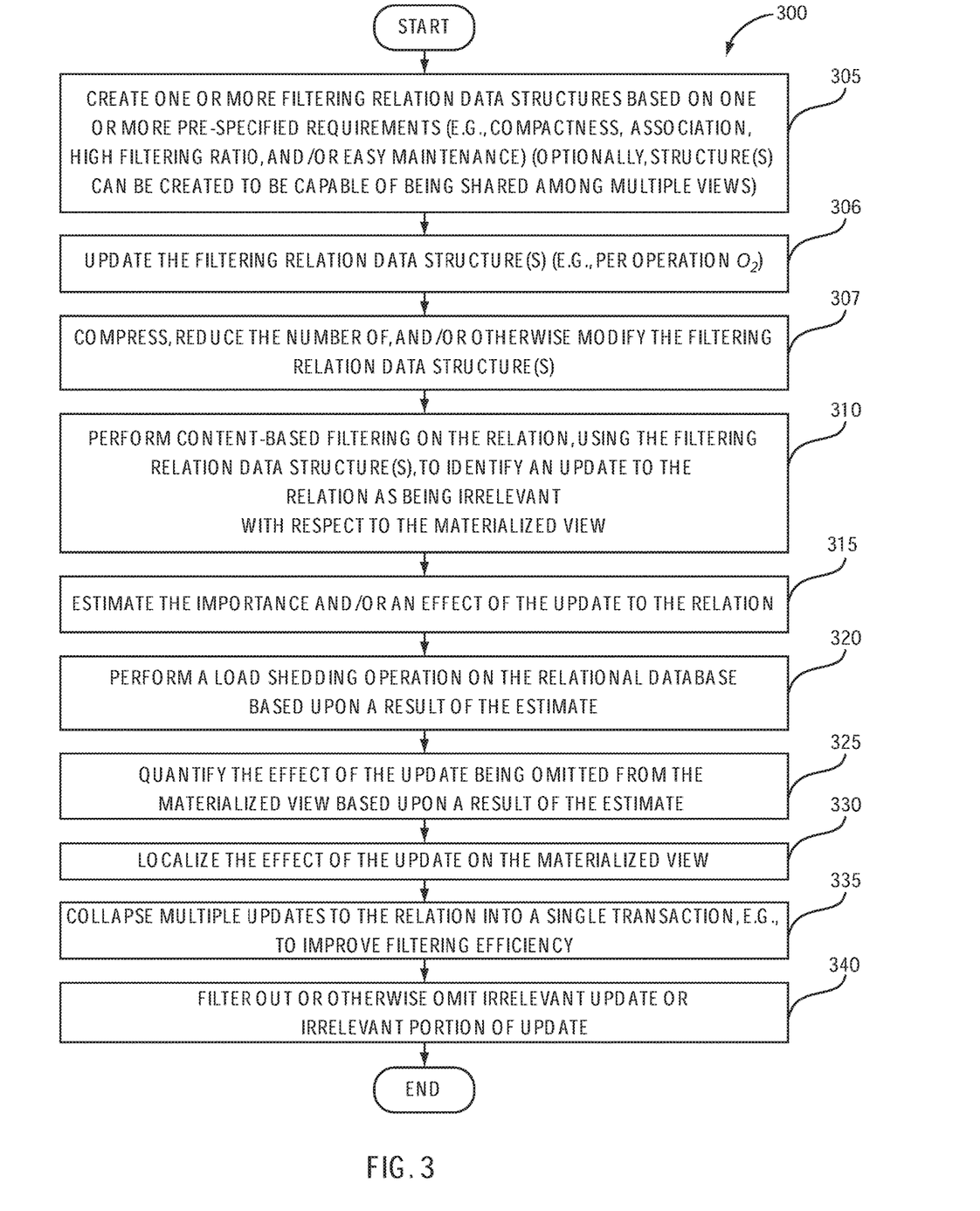
FIG. 3 is a flow diagram for an exemplary method for maintaining a materialized view defined on a relation of a relational database, according to an embodiment of the present principles.

Turning to FIG. 3, a method for maintaining a materialized view defined on a relation of a relational database is indicated generally by the reference numeral 300. It is to be appreciated that the relation may be a base relation or a derived relation (i.e., a relation derived from a base or other relation). It is to be further appreciated that the method of FIG. 3 is described particularly with respect to Operation $O_1$ and Operation $O_3$ above, which illustrate operations performed in accordance with embodiments of the present principles.

Create one or more filtering relation data structures based on one or more pre-specified requirements (step 305). Optionally, the filtering relation data structure(s) may be created at step 305 to be capable of being shared among multiple materialized views.

Update the filtering relation data structure(s) (e.g., per Operation $O_1$ described herein) (step 306).

Compress, reduce the number of, and/or otherwise modify the filtering relation data structure(s) (step 307). Step 307 may be performed, e.g., to enhance a result of the content-based filtering performed at step 310, as described in further detail herein below.

Perform content-based filtering on the relation, using the filtering relation data structure(s), to identify an update to the relation as being irrelevant with respect to the materialized view (e.g., per Operation $O_3$ described herein) (step 310).

Estimate the importance and/or an effect(s) of the update to the relation (step 315).

Perform a load shedding operation on the relational database based upon a result of the estimate performed at step 315 (step 320).

Quantify the effect of the update being omitted from the materialized view based upon a result of the estimate performed at step 315 (step 325).

Localize the effect of the update on the materialized view (step 330).

Collapse multiple updates to the relation into a single transaction (combined update) to obtain a benefit such as, but not limited to, improving filtering efficiency (step 335). Thus, if the update under consideration can be combined with other corresponding updates to the base relation into a single transaction, then increased efficiency can likely be obtained.

The update that is identified as being irrelevant or a portion thereof identified as being irrelevant is filtered out or otherwise omitted from the materialized view (step 340).

It is to be appreciated that steps 307, 315, 320, 325, 330, and 335 are optional. Thus, one or more of steps 307, 315, 320, 325, 330, and 335 may be omitted in some embodiments of the present principles.

It is to be further appreciated that while in some embodiments, the present principles may be combined with one or more prior art steps and/or approaches for maintaining materialized views, any such steps and/or approaches of the prior art are omitted from FIG. 3 for the sake of brevity.

Figure 4:
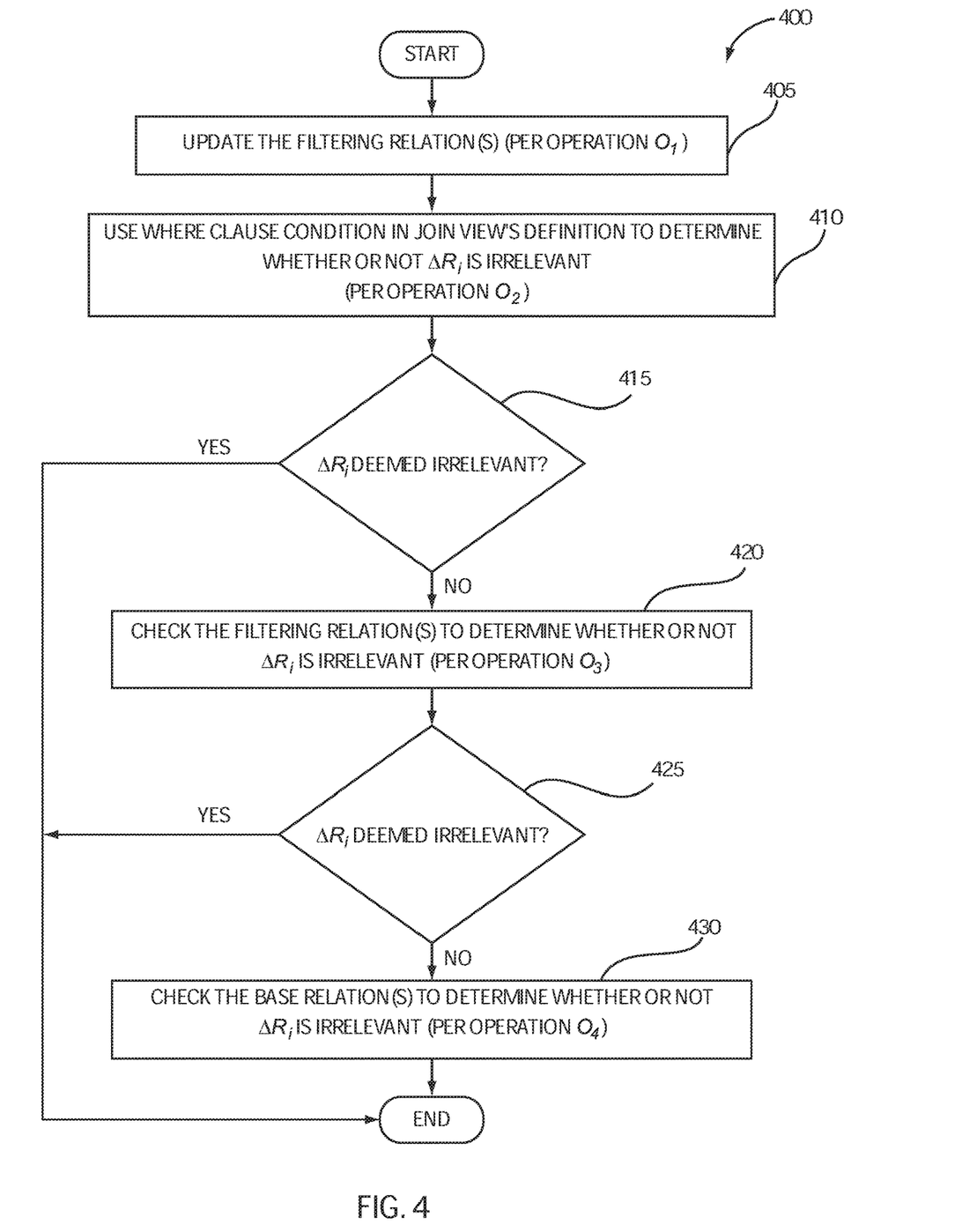
FIG. 4 is a flow diagram for another exemplary method for maintaining a materialized view defined on a relation of a relational database, according to an embodiment of the present principles.

Turning to FIG. 4, another method for maintaining a materialized view defined on a relation of a relational database is indicated generally by the reference numeral 400. It is to be appreciated that the relation may be a base relation or a derived relation (i.e., a relation derived from a base or other relation). It is to be further appreciated that the method of FIG. 4 is described to illustrate a particular embodiment that involves the present principles (e.g., Operations $O_1$ and $O_3$) and, optionally, various aspects of the prior art (e.g., Operations $O_2$ and $O_4$).

Update the filtering relation(s) (e.g., per Operation $O_1$ described herein) (step 405).

Use the where clause condition in the join view's definition to determine whether or not $\Delta R_i$ is irrelevant (e.g., per Operation $O_2$ described herein) (step 410).

It is then determined whether or not $\Delta R_i$ has been deemed irrelevant, based on the where clause (step 415). If so, then the method is terminated.

Otherwise, check the filtering relation(s) to determine whether or not $\Delta R_i$ is irrelevant (e.g., per Operation $O_3$ described herein) (step 420). It is then determined whether or not $\Delta R_i$ has been deemed irrelevant, based on the checked filtering relations (step 425). If so, then the method is terminated. Otherwise, check the base relations to determine whether or not $\Delta R_i$ is irrelevant (e.g., per Operation $O_4$ described herein) (step 430).

A description will now be given regarding a method implementing the present principles, according to an embodiment of the present principles.

Suppose that $C_w$ is the where clause condition in the definition of the join view JV. $C_w$ is rewritten into a conjunction of m terms $c_i$ ($1 \le i \le m$). Each term $c_i$ belongs to one of the following three categories:

Category 1: For each i ($1 \le i \le m_1$), $c_i$ is a conjunctive equi-join condition on two base relations $R_j$ and $R_k$ ($1 \le j < k \le n$). That is, $c_i$ is of the conjunctive form $R_j.a_1 = R_k.b_1 \wedge R_j.a_2 = R_k.b_2 \wedge \ldots \wedge R_j.a_h = R_k.b_h$ ($h \ge 1$). For different i's ($1 \le i \le m_1$), either the corresponding j's or the corresponding k's are different.

Category 2: For each i ($m_1+1 \le i \le m_2$), $c_i$ is a selection condition on a single base relation $R_j$ ($1 \le j \le n$). For different i's ($m_1+1 \le i \le m_2$), the corresponding j's are different.

Category 3: For each i ($m_2+1 \le i \le m$), $c_i$ is neither a conjunctive equi-join condition on two base relations nor a selection condition on a single base relation.

For example, consider the join view MV mentioned above. The where clause condition in the MV's definition is a conjunction of five terms. The first two terms (R.a=S.b and S.c=T.d) belong to Category 1. The other three terms (R.e>20, S.f="xyz", and T.g=50) belong to Category 2. An example term of Category 3 is R.x+S.y>T.z, which does not appear in the where clause condition of the MV's definition.

For each base relation $R_i$ ($1 \le i \le n$), we create a filtering relation $FR_i = \pi_D(\sigma_C(R_i))$. The projection list D includes all join attributes of $R_i$ that appear in some term of Category 1. That is, for each term $c_j$ ($1 \le j \le m_1$) that is of the form $R_i.a_1 = R_k.b_1 \wedge R_i.a_2 = R_k.b_2 \wedge \ldots \wedge R_i.a_h = R_k.b_h$ ($1 \le k \le n$, $k \ne i$, $h \ge 1$), attributes $\{a_1, a_2, \ldots, a_h\} \subseteq D$. Also, we build an index on attributes ($a_1, a_2, \ldots, a_h$). The selection condition C is the term of Category 2 that is on $R_i$. That is, for some j ($m_1+1 \le j \le m_2$), if the term $c_j$ is a selection condition on $R_i$, then $C = c_j$. Otherwise (i.e., if no such $c_j$ exists), we have C=true.

Figure 5:
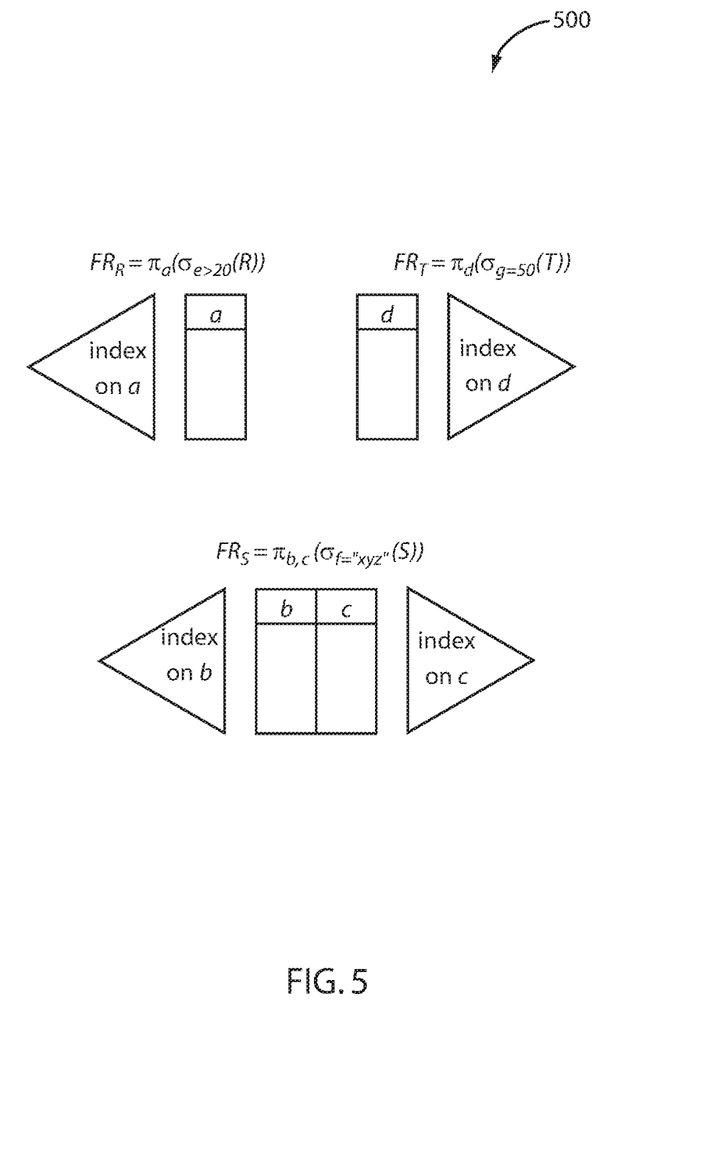
FIG. 5 is a diagram for three exemplary filtering relations, according to an embodiment of the present principles.

For example, consider the join view MV mentioned above, which will now be described with respect to FIG. 5. Turning to FIG. 5, three exemplary filtering relations are indicated generally by the reference numeral 500. A first filtering relation $FR_R$ is shown with respect to an attribute a and an index on attribute a. A second filtering relation $FR_S$ is shown with respect to attributes b and c and respective indexes on attributes b and c. A third filtering relation $FR_T$ is shown with respect to an attribute d and an index on attribute d.

In Operation $O_3$, upon an update $\Delta R_i$ to base relation $R_i$ ($1 \le i \le n$), the updated tuples in $R_i$ are joined with the corresponding filtering relations of the other base relations of the JV (i.e., $FR_1, FR_2, \ldots, FR_{i-1}, FR_{i+1}, FR_{i+2}, \ldots,$ and $FR_n$). If no join result tuple is generated, the content-based method in accordance with the present principles determines $\Delta R_i$ to be irrelevant. Otherwise, the content-based method in accordance with the present principles does not know whether $\Delta R_i$ is irrelevant unless the other base relations $R_1, R_2, \ldots, R_{i-1}, R_{i+1}, R_{i+2}, \ldots,$ and $R_n$ are checked. This is because in checking the filtering relations, the terms in Category 3 are ignored and, hence, we may have false negatives.

When the updated tuples in $R_i$ are joined with the filtering relations $FR_1, FR_2, \ldots, FR_{i-1}, FR_{i+1}, FR_{i+2}, \ldots,$ and $FR_n$, in an embodiment, the content-based method in accordance with the present principles only cares whether the join result set $J_S$ is empty. Hence, during the join process, two optimizations may be used to reduce the join overhead. In a first optional optimization, some attributes are projected out immediately after they are no longer needed. In a second optional optimization, for certain filtering relations, if there are multiple matching tuples in the filtering relation for an input tuple, then our content-based method only finds the first matching tuple rather than all matching tuples. In other words, for each input tuple to such a filtering relation, our content-based method generates at most one join result tuple. These two optional optimizations essentially compute a subset $S_S$ of the projection of $J_S$ and ensure that $S_S = \phi \Leftrightarrow J_S = \phi$. The details of these two optimizations are straightforward and readily determined by one of ordinary skill in this and related art and are, thus, omitted here for the sake of brevity. However, two examples are provided herein after for illustrative purposes.

Consider the join view MV mentioned in the introduction. To illustrate the first optimization, consider an update $\Delta R$ to base relation R. In this case, the content-based method in accordance with the present principles only joins $\pi_a(\Delta R)$ with the filtering relation $FR_S$. For the join result $J_r = \pi_a(\Delta R) \bowtie_{a=b} FR_S$, attributes a and b are projected out before $J_r$ is joined with $FR_T$. If either $J_r$ or $\pi_c(J_r) \bowtie_{c=d} FR_T$ is empty, then the content-based method knows that $\Delta R$ is irrelevant. Actually in this case, the content-based method can catch all irrelevant updates to the base relations. Thus, if we ignore the overhead of the checking/updating filtering relations, the content-based method avoids all unnecessary join view maintenance overhead in the content-independent method of the prior art. The overhead of checking/updating filtering relations is often minor.

To illustrate the second optimization, suppose tuple $t_S$ is inserted into S. In the filtering process, our content-based method joins tuple $t_S=\pi_{b,c}(t_S)$ first with $FR_R$, and then with $FR_T$. When the content-based method searches in $FR_R$, once the method finds the first tuple $t_R$ matching $t_{S1}$, the method generates the join result tuple $t_j=\pi_c(t_R \bowtie_{a=b} t_{S1})$, stops the search in $FR_R$, and continues to do the join with $FR_T$. This is because the attributes of $FR_R$ do not include the join attribute c with $FR_T$. Therefore, from the perspective of determining whether the join result with $FR_T$ is empty, there is no need to obtain more tuples in $FR_R$ that match $t_{S1}$. If no tuple in $FR_R$ is found to match $t_{S1}$, then we know that tuple $t_S$ is irrelevant. Similarly, when the content-based method searches in $FR_T$, once the method finds the first tuple matching $t_j$, the method stops the search in $FR_T$.

In the traditional join view maintenance method, the work needed when base relation $R_i$ ($1 \leq i \leq n$) is updated is as follows:

```
update R_i;
Operation O_2; /* check where clause condition in JV
    definition */
If (Operation O_2 fails)
    Operation O_4; (expensive) /* maintain JV using
        base relations /
```

When we say Operation $O_2$ fails, we mean that Operation $O_2$ cannot tell whether the update to $R_i$ is irrelevant.

For comparison, in our content-based detection method, the work needed when base relation $R_i$ ($1 \leq i \leq n$) is updated is as follows:

```
update R_i;
Operation O_1; (cheap) /* update FR_i */
Operation O_2; /* check where clause condition in JV
    definition */
If (Operation O_2 fails)
    Operation O_3; (cheap) /*check filtering relations*/
    If (Operation O_3 fails)
        Operation O_4; (expensive) /* maintain JV
            using base relations */
```

Usually, due to selection and projection, filtering relations are much smaller than base relations and, thus, more likely to be cached in memory. In this case, checking filtering relations is much faster than checking base relations. If the percentage of the updates to the base relations that are irrelevant are greater than a pre-specified threshold, and using filtering relations can filter out most of the irrelevant updates, then the extra work of (cheap) Operations $O_1$ and $O_3$ is dominated by the work saved in the expensive Operation $O_4$. As a result, the total join view maintenance overhead is greatly reduced. As an example for illustrative purposes, the pre-specified threshold may be, but is not limited to, about 5%. However, as is readily appreciated by one of ordinary skill in this and related arts, the exact percent is dependent upon the base relation size, the materialized view definition, and so forth and, thus varies from case to case.

Note that in order to minimize the sizes of filtering relations (the compactness property), in an embodiment, the terms in Category 3 are not considered in filtering relations and, thus, get ignored in the filtering process. Usually, using the terms in Categories 1 and 2 is sufficient to filter out most of the irrelevant updates.

In some embodiments of content-based filtering in accordance with the present principles, further enhancements may be performed. For example, some enhancements that may be performed for some embodiments include: compressing filtering relations; reducing the number of filtering relations; relaxing the equi-join condition of category 1; filtering out the irrelevant portion of an update; sharing a filtering relation among multiple join views; selectively skipping Operation $O_3$; using information about (intermediate) join results in Operation $O_3$; and load shedding. These enhancements may be used to enhance the compactness, efficiency, and functionality of filtering relations. It is to be appreciated that one or more of the enhancements may be utilized for a given embodiment in accordance with the present principles. These enhancements will be further described in detail herein after.

An embodiment will now be described with respect to compressing filtering relations. The performance advantages of the content-based detection method in accordance with the present principles depend heavily on the sizes of filtering relations. The smaller the filtering relations, the more likely they can be cached in memory and, thus, the greater performance advantages of the content-based detection method. Therefore, it is beneficial to reduce the sizes of filtering relations.

To achieve this size reduction goal, we use the following hashing method. For each term $c_i$ ($1 \leq i \leq m_1$) of Category 1 that is of the form $R_j.a_1=R_k.b_1 \wedge R_j.a_2=R_k.b_2 \wedge \ldots \wedge R_j.a_h=R_k.b_h$ ($1 \leq j < k \leq n$, $h \geq 1$), if the representation of attributes ($a_1, a_2, \ldots, a_h$) is longer than that of an integer attribute, then we use a hash function H to map each ($a_1, a_2, \ldots, a_h$) into an integer. In the filtering relation $FR_j$ of base relation $R_j$, we store $H(a_1, a_2, \ldots, a_h)$ rather than ($a_1, a_2, \ldots, a_h$). Also, in the filtering relation $FR_k$ of base relation $R_k$, we store $H(b_1, b_2, \ldots, b_h)$ rather than ($b_1, b_2, \ldots, b_h$).

In practice, a large number of joins are based on key/foreign key attributes and the values of these attributes are usually long strings (e.g., ids). Therefore, hashing can often reduce the sizes of filtering relations significantly.

Suppose a hash function H (or multiple hash functions) has been applied to the filtering relation $FR_i$ of base relation $R_i$ ($1 \leq i \leq n$). Upon an update $\Delta R_i$ to $R_i$, the hash function H is first applied to the corresponding join attributes of the updated tuples $\Delta R_i$. Then $\Delta R_i$ is joined with the filtering relations $FR_1, FR_2, \ldots, FR_{i-1}, FR_{i+1}, FR_{i+2}, \ldots,$ and $FR_n$.

In the above hashing method, due to hash conflicts, we may introduce false negatives in detecting irrelevant updates using filtering relations. However, typical modern computers can represent a large number of distinct integer values (e.g., a 32-bit computer can represent $2^{32}$ distinct integer values). In practice, if a good hash function is used, the probability of having hash conflicts should be low. As a result, this hashing method should not introduce a large number of false negatives.

An embodiment will now be described with respect to reducing the number of filtering relations. In practice, most updates occur to one (or a few) base relation. The other base relations are rarely updated. In this case, in an embodiment, our content-based method may only keep filtering relations for the rarely updated base relations. No filtering relation may be kept for the most frequently updated base relation. Then for the update to the mostly frequently updated base relation (i.e., for most updates to the base relations), the filtering relation maintenance overhead is avoided. As a tradeoff, when some rarely updated base relation is updated (i.e., for a few updates to the base relations), the content-based detection method is not preferred for use. Rather, we may use the standard join view maintenance method.

Suppose base relation $R_i$ (1≤i≤n) is small enough to be cached in memory in most cases. Also, no hash function has been applied to the corresponding filtering relation $FR_i$. Then there is no need to keep $FR_i$. Rather, in Operation $O_3$, when we check filtering relations for irrelevant updates to some other base relation $R_j$ (1≤j≤n, j≠i), we use base relation $R_i$ and filtering relation $FR_k$'S (1≤k≤n, k≠i, k≠j). We may build some indices on the join attributes of $R_i$. This can save the maintenance overhead of $FR_i$ when $R_i$ is updated.

An embodiment will now be described with respect to relaxing the equi-join condition of Category 1. For each term of Category 1, in an embodiment, we restrict the equi-join condition on two base relations $R_j$ and $R_k$ (1≤j<k≤n) to be of conjunctive form. In another embodiment, this condition can be relaxed so that for each term of Category 1, the equi-join condition on $R_j$ and $R_k$ is of disjunctive-conjunctive form $$\bigvee_{r=1}^{t}\left(\bigwedge_{s=1}^{h_r} R_j \cdot a_{i_{r,s}} = R_k \cdot b_{i_{r,s}}\right),$$

where t≥1 and $h_r$≥1 (1≤r≤t). Then for each r (1≤r≤t), our content-based method keeps attributes $$(a_{i_{r,1}}, a_{i_{r,2}}, \ldots, a_{i_{r,h_r}})$$

in the filtering relation $FR_j$ of $R_j$, and attributes $$(b_{i_{r,1}}, b_{i_{r,2}}, \ldots, b_{i_{r,h_r}})$$

in the filtering relation $FR_k$ of $R_k$. Also, in checking filtering relations for irrelevant updates, our content-based method considers the equi-join conditions on two base relations that are of disjunctive-conjunctive form.

An embodiment will now be described with respect to filtering out the irrelevant portion of an update. In the basic algorithm, the entire update $\Delta R_i$ to base relation $R_i$ (1≤i≤n) is treated as an entity. That is, in Operation $O_3$, $\Delta R_i$ is first joined with the filtering relations $FR_1$, $FR_2$, ..., $FR_{i-1}$, $FR_{i+1}$, $FR_{i+2}$, ..., and $FR_n$. If the join result set is empty, then we know that $\Delta R_i$ is irrelevant. Otherwise in Operation $O_4$, the entire $\Delta R_i$ is joined with the base relations $R_1$, $R_2$, ..., $R_{i-1}$, $R_{i+1}$, $R_{i+2}$, ..., and $R_n$.

In general, if $\Delta R_i$ includes multiple tuples, then some tuples may be irrelevant while others may be relevant. In this case, treating the entire $\Delta R_i$ as an entity may be too coarse. Another method is to treat each individual tuple in $\Delta R_i$ as an entity. In Operation $O_3$, the irrelevant tuples in $\Delta R_i$ are filtered out. Then the remaining tuples in $\Delta R_i$ are passed to Operation $O_4$.

Figure 6:
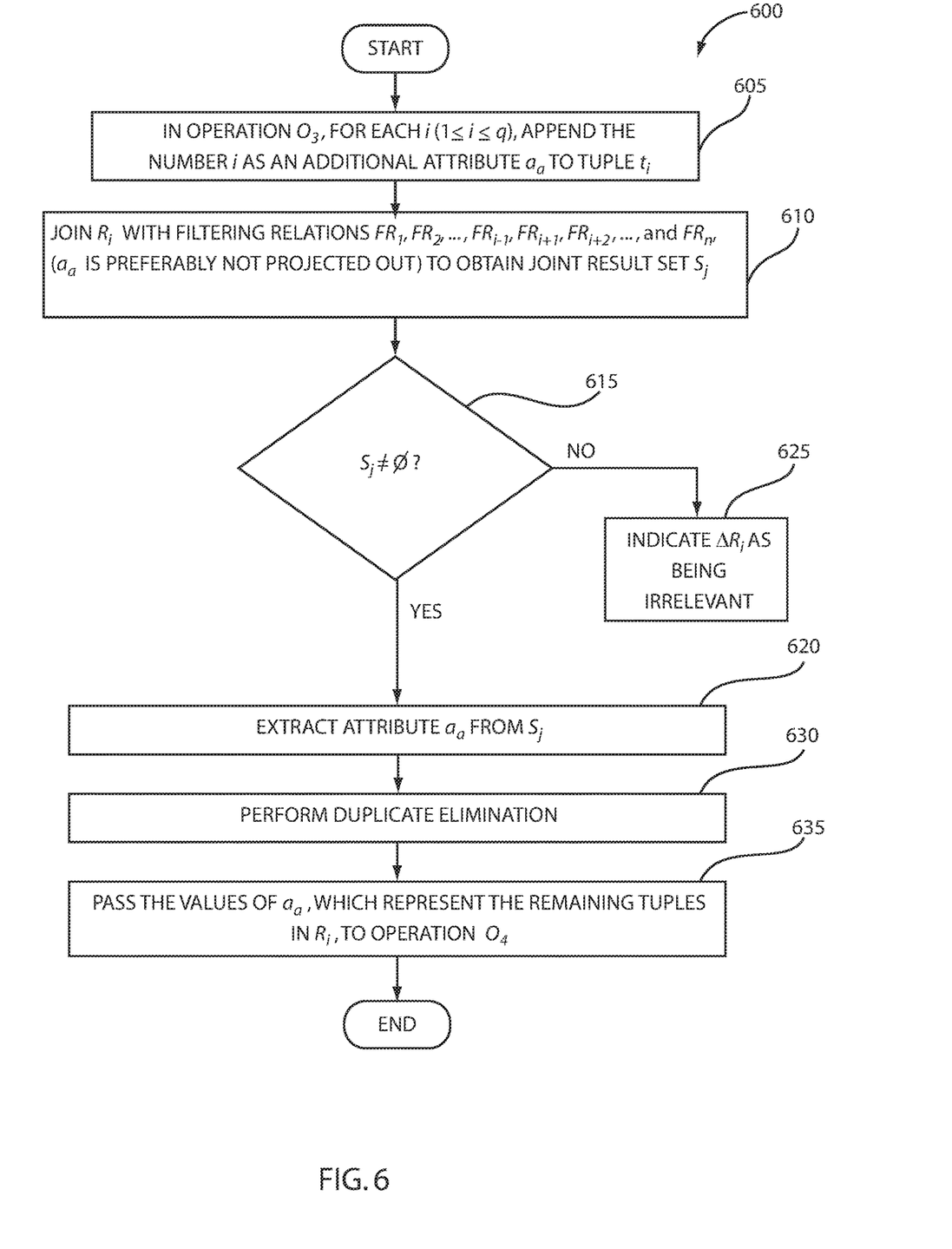
FIG. 6 is a flow diagram for a method for filtering out the irrelevant portion of an update to a materialized view MV, according to an embodiment of the present principles.

Turning to FIG. 6, a method for filtering out the irrelevant portion of an update to a materialized view MV is indicated generally by the reference numeral 600. In the method 600, suppose $\Delta R_i$ contains q tuples $t_i$ (1≤i≤q). In Operation $O_3$, for each i (1≤i≤q), the number i is appended as an additional attribute $a_a$ to tuple $t_i$ (step 605). When $\Delta R_i$ is joined with the filtering relations $FR_1$, $FR_2$, ..., $FR_{i-1}$, $FR_{i+1}$, $FR_{i+2}$, ..., and $FR_n$, $a_a$ is never projected out (step 610). After we obtain the join result set $S_j$ from step 610, if $S_j$·Ø (step 615), attribute $a_a$ is extracted from $S_j$ (step 620). Otherwise, the update $\Delta R_i$ is indicated as being irrelevant (step 625). Then after duplicate elimination (step 630), the values of $a_a$ represent the remaining tuples in $\Delta R_i$ that need to be passed to Operation $O_4$ (step 635).

An embodiment will now be described with respect to sharing a filtering relation among multiple join views.

Suppose multiple join views are built on the same base relation R. A simple method is to build multiple filtering relations of R, one for each join view. In certain cases, this may introduce redundancy among these filtering relations and cause two problems. First, the probability that the filtering relations are cached in memory is decreased. As a result, Operation $O_3$ becomes more expensive. Second, when R is updated, updating all the filtering relations of R will be costly.

In this case, if possible, it may be better to let multiple join views share the same filtering relation of base relation R. For example, suppose join view $JV_1$ is defined as follows:
create materialized view $JV_1$ as
select * from $R_1$, S, $T_1$
where $R_1$.a=S.b and S.c=$T_1$.d and $C_1$.
$C_1$ is a selection condition on S.f. Join view $JV_2$ is defined as follows:
create materialized view $JV_2$ as
select * from $R_2$, S, $T_2$
where $R_2$.e=S.b and S.f=$T_2$.g and $C_2$.
$C_2$ is a selection condition on S.c. Then for base relation S, we may build only one filtering relation $FR_S = \pi_{b,c,f}(\sigma_{C_1 \vee C_2}(S))$ rather than two filtering relations $FR_S = \pi_{b,c}(\sigma_{C_1}(S))$ and $FR_{S2} = \sigma_{b,f}(\sigma_2(S))$. $FR_S$ can be used for both $JV_1$ and $JV_2$. Whether $FR_S$ is better than $FR_{S1}$ and $FR_{S2}$ depends on the overlapping degree of $C_1$ and $C_2$.

Figure 7:
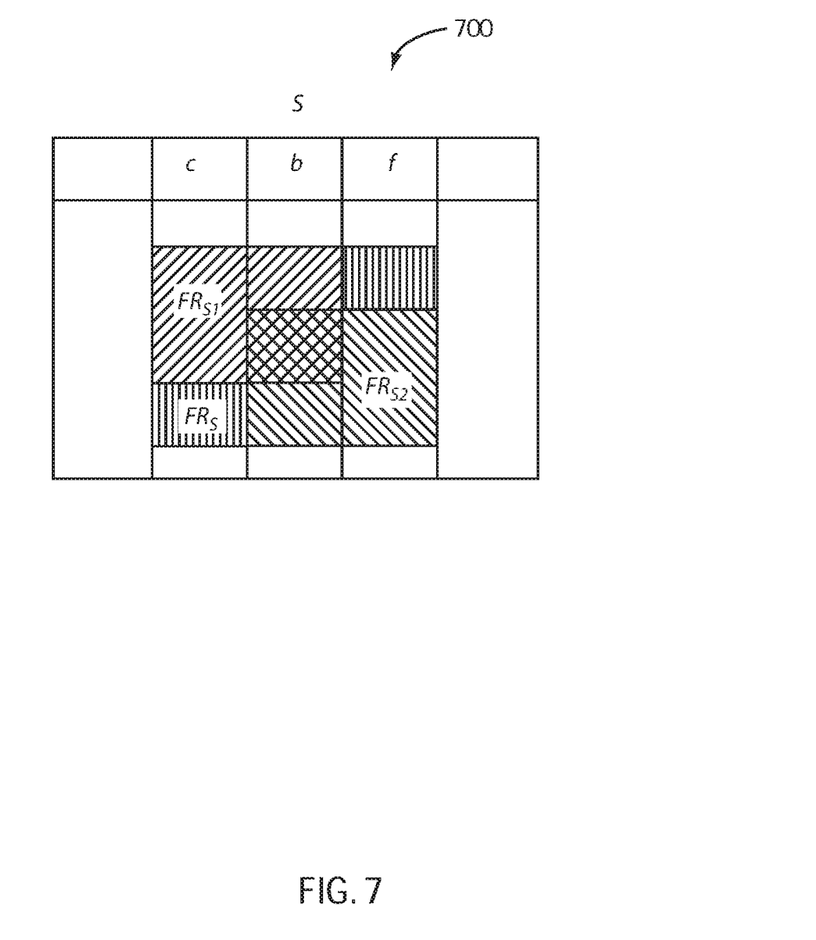
FIG. 7 is a diagram for an exemplary base relation S to which the present invention may be applied, according to an embodiment thereof.

Turning to FIG. 7, an exemplary base relation S to which the present invention may be applied is indicated generally by the reference numeral 700. Base relation S is built on filtering relations $FR_S$, $FR_{S1}$, and $FR_{S2}$, and involves attributes c, b, and f.

An embodiment will now be described with respect to selectively skipping Operation $O_3$. If either a small percentage of the update $\Delta R_i$ to base relation $R_i$ is irrelevant, or $\Delta R_i$ is large enough so that hash/sort-merge join becomes the join method of choice for the join with some base relation $R_j$ (1≤j≤n, j≠i), then the content-based method may perform worse than the traditional content-independent method of the prior art. In this case, Operation $O_3$ can be skipped in the content-based method. This is equivalent to using the content-independent method plus updating the filtering relation $FR_i$ accordingly. We can easily build an analytical model that can provide a means to determine the upper bound on the size of $\Delta R_i$ (or lower bound on the percentage of $\Delta R_i$ that is irrelevant) where performing Operation $O_3$ is beneficial. As an example for illustrative purposes, the "small percentage" of the update $\Delta R_i$ to base relation $R_i$ that is irrelevant may be, but is not limited to, about 0.5%. However, as is readily appreciated by one of ordinary skill in this and related arts, the exact percent is dependent upon the base relation size, the materialized view definition, and so forth and, thus varies from case to case.

An embodiment will now be described with respect to using the information about (intermediate) join results in Operation $O_3$. Recall that in Operation $O_3$, $\Delta R_i$ is joined with the filtering relations $FR_1$, $FR_2$, ..., $FR_{i-1}$, $FR_{i+1}$, $FR_{i+2}$, ..., and $FR_n$. As a result, we know the (intermediate) join result sizes. If these (intermediate) join result sizes are significantly different from original estimates, we know that the statistics in the database are imprecise.

Then in Operation $O_4$, when the remaining tuples in $\Delta R_i$ (after filtering) are joined with the base relations $R_1$, $R_2, \ldots, R_{i-1}, R_{i+1}, R_{i+2}, \ldots,$ and $R_n$, the information that is gained in Operation $O_3$ may be used to choose a better query plan.

For example, consider the join view mentioned in the introduction. The base relation R is updated by $\Delta R$. Suppose that it is believed that each tuple in $\Delta R$ has only a few matching tuples in base relation S. As a result, in Operation $O_4$, index nested loops is chosen as the join method for the join with S. However, from the information we gained in Operation $O_3$, we know that each tuple in $\Delta R$ has a large number of matching tuples in the filtering relation $FR_S$ (and thus also a large number of matching tuples in S). Then in Operation $O_4$, our content-based method may indicate to choose hash join as the join method for the join with S.

An embodiment will now be described with respect to load shedding. Our content-based method can estimate the effect of an update to the base relation on the join view. If the RDBMS is overloaded, then such estimate can provide guidance to a load shedding algorithm. For example, we may ignore those "unimportant" updates to base relations during join view maintenance. Moreover, we may collapse multiple updates into a single transaction so that more efficient algorithms (such as hash/sort-merge join) can be used.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for maintaining a materialized view defined on a base relation of a relational database, the method comprising:
   generating a materialized view in a materialized view maintenance system, implemented in a computing device having at least a processor and a memory device, that is defined on one or more base relations;
   generating a respective filtering relation for each base relation that captures a relationship among multiple join attributes of the base relation and includes a summary of attributes of the base relation, including all join attributes of the base relation that match a disjunctive-conjunctive equi-join condition on two base relations;
   determining whether each of a plurality of updates to base relations of the materialized view is irrelevant with respect to relations in the materialized view by performing content-based filtering on each update by joining filtering relations, of base relations other than the updated base relation, to updated tuples of the updated base relation, to determine that no join result tuple is produced; and
   maintaining the materialized view in accordance with at least one of the updates, omitting at least one update that is determined to be irrelevant.

2. The method of claim 1, wherein the at least one filtering relation data structure is shared among multiple materialized views.

3. The method of claim 1, further comprising localizing an effect of the update on the materialized view.

4. The method of claim 1, further comprising collapsing multiple updates to the base relation to improve filtering efficiency.

5. The method of claim 1, wherein performing content-based filtering comprises filtering based on a threshold-based filtering ratio requirement that selectively pre-specifies a percentage of irrelevant updates to be filtered, a value of the threshold-based filtering ratio requirement being less than one hundred percent.

6. The method of claim 1, wherein performing content-based filtering comprises filtering based on an association requirement for capturing a relationship among multiple join attributes of the base relation, wherein the base relation involves multiple matching tuples with respect to an input tuple, and further comprises finding only a first matching one of the multiple tuples while ignoring other ones of the multiple matching tuples when providing an output based on the association requirement.

7. The method of claim 1, wherein a load shedding operation is performed by collapsing multiple updates into a single transaction.

8. A non-transitory computer readable storage medium comprising a computer readable program for maintaining a materialized view defined on a base relation of a relational database, wherein the computer readable program when executed on a computer causes the computer to perform the steps of:
   generating a materialized view in a materialized view maintenance system, implemented in a computing device having at least a processor and a memory device, that is defined on one or more base relations;
   generating a respective filtering relation for each base relation that captures a relationship among multiple join attributes of the base relation and includes a summary of attributes of the base relation, including all join attributes of the base relation that match a disjunctive-conjunctive equi-join condition on two base relations;
   determining whether each of a plurality of updates to base relations of the materialized view is irrelevant with respect to relations in the materialized view by performing content-based filtering on each update by joining filtering relations of base relations other than the updated base relation to updated tuples of the updated base relation to determine that no join result tuple is produced; and
   maintaining the materialized view in accordance with at least one of the updates, omitting at least one update that is determined to be irrelevant.

9. The computer program product of claim 8, wherein the at least one filtering relation data structure is capable of being shared among multiple materialized views.

10. A system for maintaining a materialized view defined on a base relation of a relational database, the system comprising:
    a memory device configured to store the base relation therein; and
    a materialized view manager comprising a processor configured to generate a materialized view that is defined on one or more base relations, to generate a respective filtering relation for each base relation that captures a relationship among multiple join attributes of the base relation and that includes a summary of attributes of the base relation, including all join attributes of the base relation that match a disjunctive-conjunctive equi-join condition on two base relations, to determine whether each of a plurality of updates to base relations of the materialized view is irrelevant with respect to relations in the materialized view by performing content-based filtering on each update by joining filtering relations of base relations other than the updated base relation to updated tuples of the updated base relation to determine that no join result tuple is produced, and to maintain the materialized view in accordance with at least one of the updates, omitting at least one update that is determined to be irrelevant.

11. The system of claim 10, wherein the at least one filtering relation data structure is capable of being shared among multiple materialized views.

12. The system of claim 10, wherein said materialized view manager localizes an effect of the update on the materialized view.

13. The system of claim 10, wherein said materialized view manager collapses multiple updates to the base relation to improve filtering efficiency.

* * * * *